G. D. BULMER.
CUSPIDOR.
APPLICATION FILED FEB. 14, 1910.
963,511.
Patented July 5, 1910.
2 SHEETS—SHEET 1.
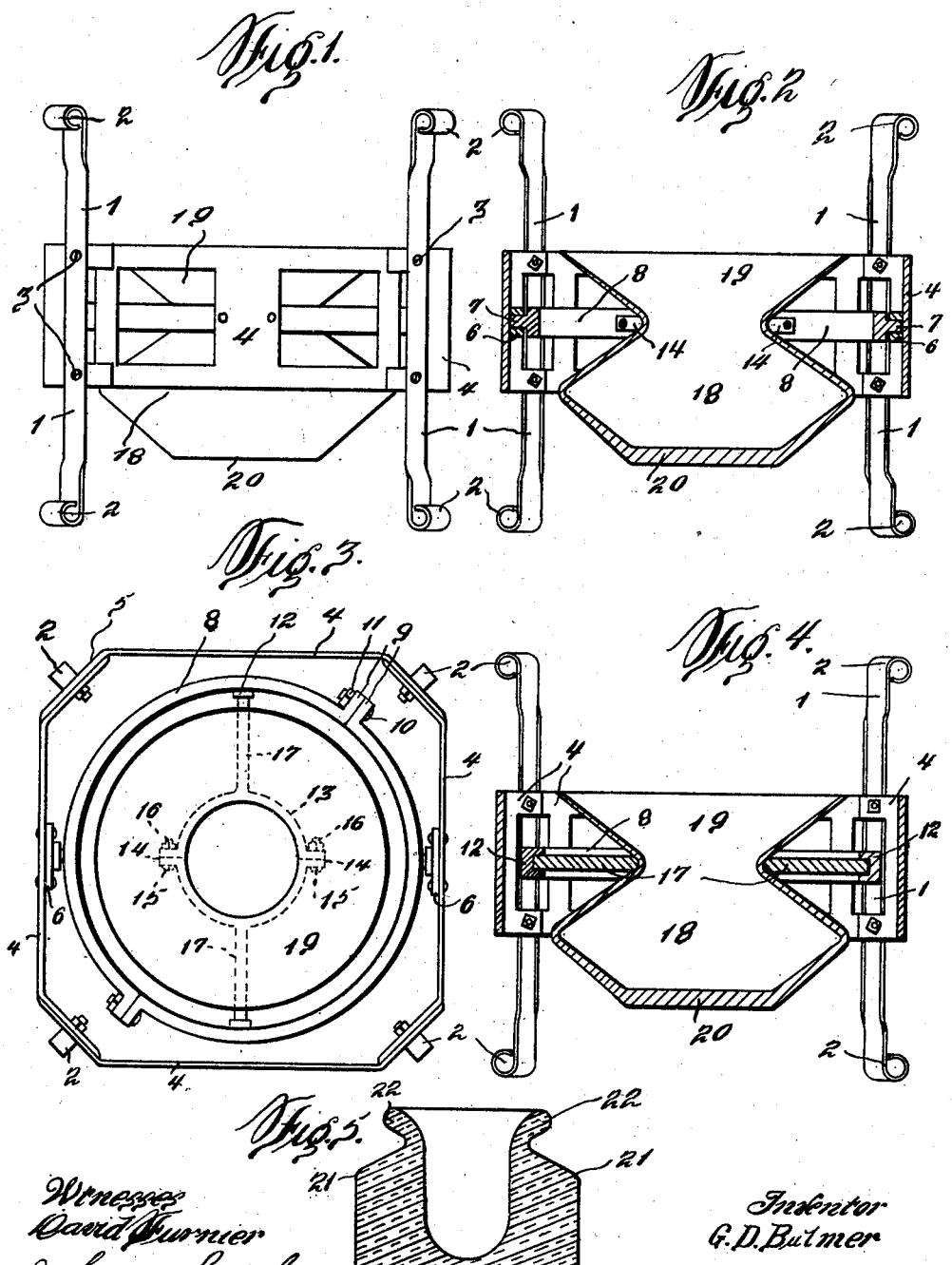
Witnesses
David Turnier
John L. Stephany
Inventor
G. D. Bulmer
By [signature]
Attorneys

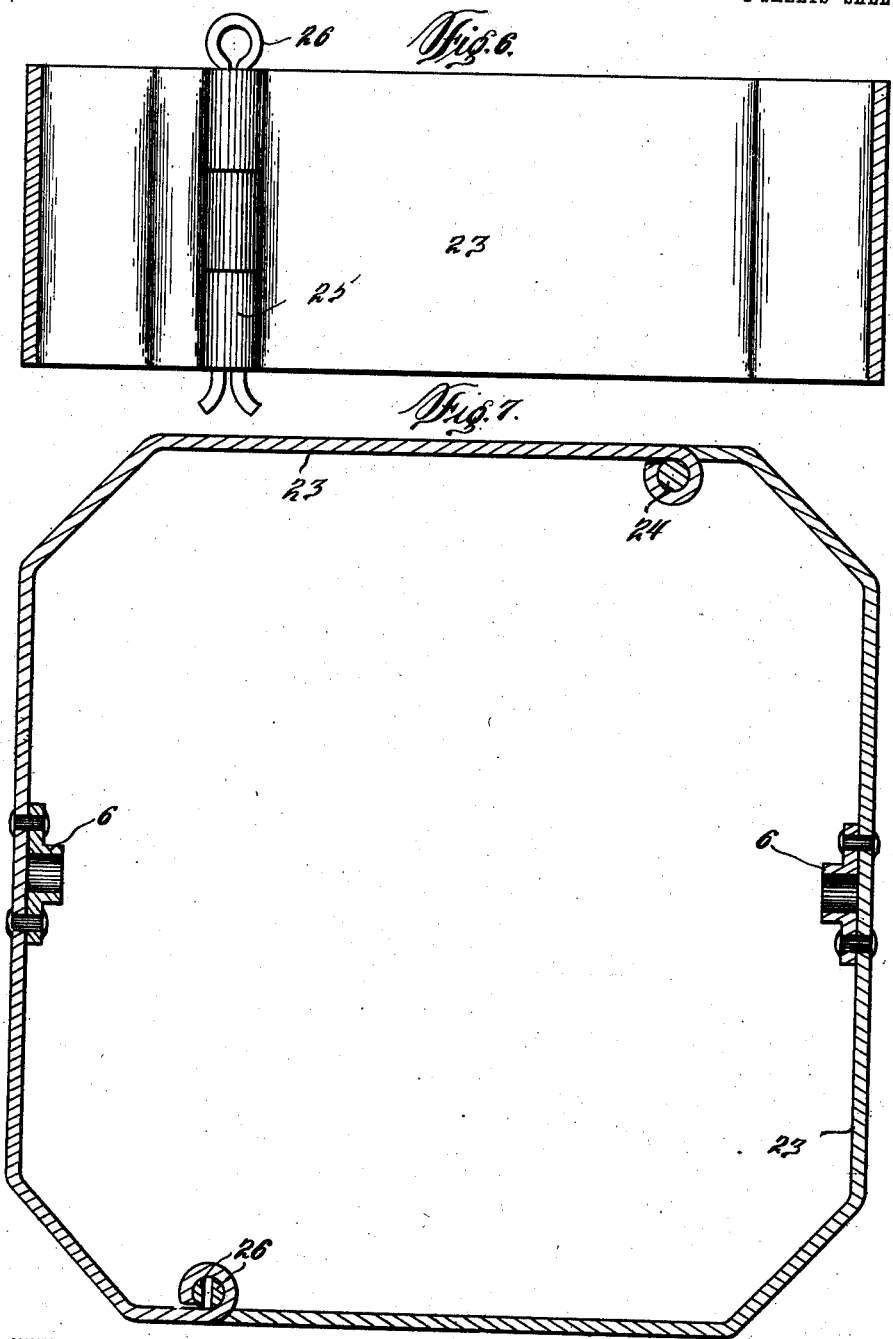

UNITED STATES PATENT OFFICE.

GEORGE D. BULMER, OF DUQUESNE, PENNSYLVANIA.

CUSPIDOR.

963,511.  Specification of Letters Patent. Patented July 5, 1910.

Application filed February 14, 1910. Serial No. 543,832.

*To all whom it may concern:*

Be it known that I, GEORGE D. BULMER, a citizen of the United States of America, residing at Duquesne, in the county of Allegheny and State of Pennsylvania, have invented certain new and useful Improvements in Cuspidors, of which the following is a specification, reference being had therein to the accompanying drawing.

This invention relates to cuspidors, and the object of my invention is to provide positive and reliable means for normally supporting a cuspidor in a vertical position, thus preventing the contents of the cuspidor from being spilled should the support of the cuspidor be accidentally tilted or upset.

I attain the above object by providing a cuspidor or similar receptacle with a novel support embodying the principle of "gimbal support" or "universal connection" between rings and the cuspidor and its support, whereby the support can assume various positions without causing the contents of the cuspidor to become accidentally displaced.

The cuspidor is designed along ornamental lines and is adapted to provide a rigid and durable structure that will not only protect the cuspidor, but withstand rough usage.

My invention will be hereinafter specifically described and then claimed, and reference will now be had to the drawing forming part of this specification, wherein:—

Figure 1 is a side elevation of the cuspidor, Fig. 2 is a vertical cross sectional view of the same, Fig. 3 is a plan of the cuspidor, Fig. 4 is a vertical transverse sectional view of the cuspidor, Fig. 5 is a vertical sectional view of a modified form of receptacle upon a small scale, Fig. 6 is an enlarged cross sectional view of a modified form of frame, and Fig. 7 is an enlarged horizontal sectional view of the same.

In the accompanying drawing the reference numerals 1 denote vertical legs or posts, preferably made of metal, with the upper and lower ends thereof bent to provide feet 2. Secured to the legs or posts intermediate the ends thereof by screw bolts 3 or other fastening means is a substantially rectangular frame, comprising oppositely disposed frames 4 having the ends bent to overlap the ends of adjoining frames, as at 5, whereby the overlapping ends can be connected to the legs or posts 1 by the fastening means 3.

Two of the oppositely disposed frames 4 have the inner walls thereof provided with bearing plates 6 and trunnioned in said bearing plates are the trunnions 7 of a two-part ring 8, the parts forming the ring having the ends thereof bent outwardly, as at 9 and connected by bolts 10 and nuts 11.

Diametrically opposed inner sides of the ring 8 are provided with bearings 12, these bearings being arranged at right angles to the bearing plate 6 for supporting a ring 13 of less diameter than the ring 8, said ring being made in two parts with the ends of said parts bent at right angles, as at 14 and connected by bolts 15 and nuts 16. The parts of the ring 13 intermediate the ends thereof are provided with outwardly projecting trunnions 17 adapted to extend into the bearings 12, these trunnions being also at right angles to the trunnions 7 of the ring 8, thereby allowing the ring 13 to tilt in a plane at all times at right angles to the plane at which the ring 8 can be tilted.

The two-part ring 13 allows a receptacle to be suspended within the support, and as shown in Figs. 1 to 4 inclusive, a cuspidor 18 is mounted in the ring 13, the cuspidor being supported within said ring by the funnel shaped mouth 19 thereof. The cuspidor 18 is provided with a weighted bottom 20 adapted through gravitation to normally hold the receptacle in a vertical position irrespective of the position of its support.

The support can be made upon a small scale and in lieu of the cuspidor 18, an inkwell having a mouthpiece 22 that can be easily gripped by the two-part ring 13 for suspending the inkwell within the support.

In Figs. 6 and 7 of the drawings I have illustrated a modified form of frame, comprising two sections 23 hinged together, as at 24 with the free ends thereof provided with barrels 25 adapted to be connected by a cotter pin 26. This frame is provided with the oppositely disposed bearing plates 6 and is adapted to be supported by the vertical legs or posts 1. By making the frame in two hinged sections, the parts of the cuspidor can be easily disassembled when it is desired to clean the same.

The structure shown in Figs. 1 to 4 inclusive is made of metal throughout and besides ornamenting the cuspidor 18, the support thereof can be made ornamental, whereby the structure in its entirety will present a neat and attractive appearance.

Having now described my invention what I claim as new, is:—

The combination with a receptacle having a weighted bottom, of a support adapted to normally retain said receptacle in a vertical position, said support comprising vertical legs, a substantially rectangular frame adapted to be secured to said legs intermediate the ends thereof, bearing plates adapted to be carried by oppositely disposed inner sides of said frames, a two-part ring adapted to be trunnioned in said bearing plates, a second two-part ring adapted to support said receptacle in the first mentioned ring, and trunnions carried by the last mentioned ring and adapted to tiltably support said ring in the first mentioned ring whereby the last mentioned ring can be tilted in a plane at right angles to the first mentioned ring, substantially as described.

In testimony whereof I affix my signature in the presence of two witnesses.

GEORGE D. BULMER.

Witnesses:
KARL H. BUTLER,
EVA A. MILNE.